United States Patent
Cheng et al.

(10) Patent No.: US 11,603,488 B2
(45) Date of Patent: Mar. 14, 2023

(54) PROCESS FOR PREPARING METAL-CHELATE RETARDER BY SOL-GEL METHOD

(71) Applicants: SOUTHWEST PETROLEUM UNIVERSITY, Chengdu (CN); CNPC BOHAI DRILLING ENGINEERING COMPANY LIMITED, Tianjin (CN)

(72) Inventors: Xiaowei Cheng, Chengdu (CN); Shuxun Zhao, Chengdu (CN); Yang Yu, Chengdu (CN); Zhihui Lin, Chengdu (CN); Gaoyin Zhang, Chengdu (CN); Chaoming Wu, Chengdu (CN); Kaiqiang Liu, Chengdu (CN); Wenming Liu, Chengdu (CN); Zuwei Chen, Chengdu (CN); Jiawen Fu, Chengdu (CN); Tianpeng Zuo, Chengdu (CN); Ben Qi, Chengdu (CN); Chunmei Zhang, Chengdu (CN); Zaoyuan Li, Chengdu (CN); Sheng Huang, Chengdu (CN); Xiaoyang Guo, Chengdu (CN)

(73) Assignees: SOUTHWEST PETROLEUM UNIVERSITY, Chengdu (CN); CNPC BOHAI DRILLING ENGINEERING COMPANY LIMITED, Tianjin (CN)

(*) Notice: Subject to any disclaimer, the term of this patent is extended or adjusted under 35 U.S.C. 154(b) by 420 days.

(21) Appl. No.: 16/936,174

(22) Filed: Jul. 22, 2020

(65) Prior Publication Data

US 2021/0079288 A1    Mar. 18, 2021

(30) Foreign Application Priority Data

Sep. 18, 2019 (CN) .......................... 201910883147.2

(51) Int. Cl.
    C09K 8/467    (2006.01)
    C04B 24/40    (2006.01)
    C07F 5/06     (2006.01)
    C07F 15/02    (2006.01)
    C04B 103/22   (2006.01)

(52) U.S. Cl.
    CPC .............. C09K 8/467 (2013.01); C04B 24/40 (2013.01); C07F 5/069 (2013.01); C07F 15/02 (2013.01); C04B 2103/22 (2013.01)

(58) Field of Classification Search
    None
    See application file for complete search history.

(56) References Cited

U.S. PATENT DOCUMENTS

| 6,454,850 B2 * | 9/2002 | Yamashita .......... C04B 24/2647 106/727 |
| 11,254,852 B2 * | 2/2022 | Sen .......................... E21B 33/14 |
| 2017/0096874 A1 * | 4/2017 | Parsons ................... G06F 30/20 |
| 2017/0130115 A1 * | 5/2017 | Ballard .................. C09K 8/428 |

FOREIGN PATENT DOCUMENTS

EP    2251524 A1 *  11/2010  ........... E21B 21/003

* cited by examiner

Primary Examiner — John J Figueroa
(74) Attorney, Agent, or Firm — Muncy, Geissler, Olds & Lowe, P.C.

(57) ABSTRACT

The present invention relates to a process for preparing a metal-chelate retarder by a sol-gel method. The method comprises the following steps: weighing calcium nitrate tetrahydrate, aluminum nitrate nonahydrate and ferric nitrate nonahydrate according to a certain mass ratio and adding them into deionized water; placing the mixed solution on a magnetic stirrer and stirring the mixed solution evenly; adding citric acid monohydrate or gluconic acid, ethylene glycol or glycerol, and placing the mixed solution into a water bath to react to obtain the metal-chelate retarder. The process of the present invention has a reliable principle, overcomes the defects of long production period, complex preparation and the like of the existing retarders, has the advantages of simple process operation, cheap and easily available raw materials, and short production period. The prepared retarder has wide temperature adaptation range and adjustable thickening time, is suitable for large-scale industrial production, and has a wide market application prospect.

3 Claims, No Drawings

PROCESS FOR PREPARING METAL-CHELATE RETARDER BY SOL-GEL METHOD

TECHNICAL FIELD

The present invention relates to a method for preparing a novel retarder in a well cementing process in the field of oil and gas field exploration and development, and more particularly to a process for preparing a metal-chelate retarder by a sol-gel method, belonging to a preparation method of a well-cementing cement slurry admixture.

BACKGROUND ART

The petroleum industry is the blood of economic development, and the quality of well cementing directly affects the exploitation of petroleum and the production life of oil and gas wells. With the improvement of drilling technology, oil exploration and development continue to develop toward high-temperature wells, deep wells and ultra-deep wells. The temperature difference and pressure difference between upper and lower formations of a cement injection well section are getting bigger and bigger. Under high temperature and high pressure, in order to ensure the safety of construction and the quality of well cementing, a retarder is generally added to cement slurry to increase the thickening time of the cement slurry and prevent the pumped cement slurry from thickening and coagulating rapidly during the entire pumping process, thereby controlling the pumpable time of the cement slurry.

The hydration process of conventional G-grade oil well cement mainly includes: an initial active period, an induction period, an acceleration period and a hardening period. In the rapid and active period of initial reaction, when cement is in contact with water, a very short but extremely intense exothermic reaction starts immediately, followed by a fast drop of a hydration rate before the induction period. The addition of a retarder mainly affects a reaction stage. The action mechanism of the retarder generally lies in that: retarder molecules bind with free $Ca^{2+}$ or water molecules to form a double salt, which is adsorbed on the surfaces of cement particles and poisons a nucleation process of crystals, thereby preventing the growth of the crystals and inhibiting the hydration of the cement (Wang Zhenjun, He Tingshu. Action Mechanism of Retarder and Its Effects on Performances of Cement Concrete[J]. Highway, 2006(07): 149-154).

The retarders commonly used at home and abroad are lignin sulfur salts, sugar compounds, hydroxycarboxylic acids and their salts. The raw materials of lignin retarders are natural products, which are greatly affected by regions and temperatures, and have great limitations in the selection of production places. Hydroxycarboxylic acid retarders require more raw materials during synthesis, are relative complicated in synthesis process and relatively long in synthesis time and easily produce by-products to cause environmental pollution. In view of this, the present invention provides a method for preparing a novel retarder, which overcomes the defects that the existing retarders are unavailable in raw materials, complicated to prepare, long in time period, by-products and the like. A retarder prepared by this method has a wide temperature adaptation range and adjustable thickening time. Meanwhile, because the retarder is a precursor of tetracalcium iron aluminate, it will be transformed into tetracalcium iron aluminate under long-term high-temperature curing. Tetracalcium iron aluminate is one of constituent minerals of cement. This transformation will play a positive role in the development of the later strength of cement stone.

SUMMARY OF THE INVENTION

An object of the present invention is to provide a process for preparing a metal-chelate retarder by a sol-gel method. The process of the present invention has a reliable principle, overcomes the defects of long production period, complex preparation and the like of the existing retarders, and has the advantages of simple process operation, cheap and easily available raw materials, and short production period. The retarder prepared by this method has wide temperature adaptation range and adjustable thickening time, is suitable for large-scale industrial production, and has a wide market application prospect.

To fulfill the above technical objects, the present invention adopts the following technical solutions.

A process for preparing a metal-chelate retarder by a sol-gel method comprises the following steps: weighing calcium nitrate tetrahydrate, aluminum nitrate nonahydrate and ferric nitrate nonahydrate according to a certain mass ratio and adding them into deionized water; placing the mixed solution on a magnetic stirrer and stirring the mixed solution evenly; adding citric acid monohydrate or gluconic acid, ethylene glycol or glycerol, and placing the mixed solution into a water bath to react to obtain the metal-chelate retarder.

The process for preparing the metal-chelate retarder by the sol-gel method sequentially comprises the following steps:

(1) adding 80 to 120 g of calcium nitrate tetrahydrate, 20 to 40 g of aluminum nitrate nonahydrate and 10 to 15 g of ferric nitrate nonahydrate into 50 to 70 ml of deionized water, placing the mixed solution on a magnetic stirrer and stirring for 50 to 60 min to be mixed evenly to obtain a solution A;

(2) adding 30 to 50 g of chelating agent to the solution A, placing the mixed solution in a water bath at 60 to 80° C. and stirring to obtain a light yellow solution B, wherein the chelating agent is citric acid monohydrate or gluconic acid; and (3) stirring and adding 5 to 20 g of esterifying agent to the solution B to perform an esterification reaction continuously for 12 to 24 hours to obtain the metal-chelate type retarder, wherein the esterifying agent is ethylene glycol or glycerol.

In the step (2), the chelating agent is added to the solution A, placed in a water bath at 60° C. and stirred for 1 to 2 hours, and then the water bath temperature is adjusted to 80° C.

A reaction mechanism of the process for preparing the metal-chelate retarder by the sol-gel method is as follows (taking citric acid monohydrate as an example):

the calcium nitrate tetrahydrate, the aluminum nitrate nonahydrate and the ferric nitrate nonahydrate react with the citric acid monohydrate in an aqueous solution; since nitrates are easily soluble in water, a metal nitrate is hydrolyzed into a metal cation ($M^+$) and a nitrate ion ($NO3^-$) in water; citric acid is added to the solution as a chelating agent, which can provide three carboxyl oxygen atoms and one hydroxyl oxygen atom to coordinate with the metal cation; the two-molecule citric acid and the metal cation form a hexa-coordinate octahedral structure; meanwhile, the chelation reaction of the citric acid produces a large amount of free $H^+$ in the solution, which provides an acidic environment for the reaction.

The ethylene glycol is added to esterify two carboxyl groups that have not reacted with chelates, so that the chelates will be interconnected to form an oligomer, which is the main component of the retarder.

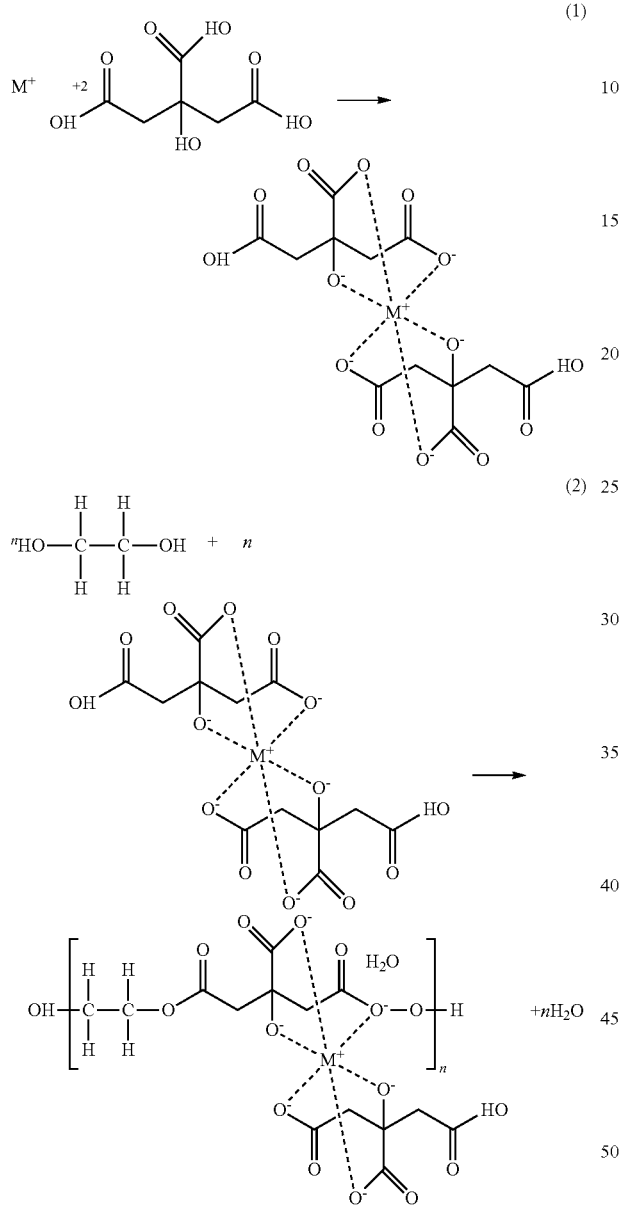

Compared with the prior art, the present invention has the following beneficial effects:

(1) the colloidal chemical method and the sol-gel method are adopted, such that no new impurities will be introduced through chemical synthesis in the synthesis process, and the prepared metal-chelate retarder not only does not affect the compressive strength of cement stone, but also can effectively delay the cement thickening time;

(2) various raw materials are wide in sources and low in price, and have the advantage of low cost;

(3) the prepared retarder is wider in temperature range, and adjustable in thickening time; and (4) the method is simple in operation, high in yield, short in production cycle, low in quality requirements on raw materials, and suitable for large-scale industrial applications.

DETAILED DESCRIPTION

The present invention is further described below with reference to the embodiments, for those skilled in the art to understand the present invention. However, it should be clear that the present invention is not limited to the scope of the specific embodiments. As long as various changes are within the spirit and scope of the present invention as defined and determined by the appended claims, they are all protected.

I. Preparation of High-Temperature Resistant Oil Well Cement Retarder

Embodiment 1

A process for preparing a metal-chelate retarder by a sol-gel method sequentially comprises the following steps: weighing 80 g of calcium nitrate tetrahydrate (Ca$(NO_3)_2 \cdot 4H_2O$), 20 g of aluminum nitrate nonahydrate (Al$(NO_3)_3 \cdot 9H_2O$) and 10 g of ferric nitrate nonahydrate (Fe$(NO_3)_3 \cdot 9H_2O$) in sequence with a scale and then adding them into 50 ml of deionized water; placing the mixed solution on a magnetic stirrer and stirring for 50 min to be mixed evenly to obtain a solution A; weighing 40 g of citric acid monohydrate (C$_6$H$_8$O$_7 \cdot$H$_2$O) and adding to the solution A, placing the mixed solution in a water bath at 80° C. and stirring to obtain a light yellow solution B; adding 5 g of ethylene glycol to the light yellow solution B sequentially to perform an esterification reaction continuously for 12 hours to obtain the metal-chelate type retarder.

Embodiment 2

A process for preparing a metal-chelate retarder by a sol-gel method sequentially comprises the following steps: weighing 90 g of calcium nitrate tetrahydrate (Ca$(NO_3)_2 \cdot 4H_2O$), 30 g of aluminum nitrate nonahydrate (Al$(NO_3)_3 \cdot 9H_2O$) and 10 g of ferric nitrate nonahydrate (Fe$(NO_3)_3 \cdot 9H_2O$) in sequence with a scale and then adding them into 60 ml of deionized water; placing the mixed solution on a magnetic stirrer and stirring for 50 min to be mixed evenly to obtain a solution A; weighing 30 g of gluconic acid and adding to the solution A, placing the mixed solution in a water bath at 80° C. and stirring to obtain a light yellow solution B; adding 10 g of glycerol to the light yellow solution B sequentially to perform an esterification reaction for 12 hours to obtain the metal-chelate type retarder.

Embodiment 3

A process for preparing a metal-chelate retarder by a sol-gel method sequentially comprises the following steps: weighing 120 g of calcium nitrate tetrahydrate (Ca$(NO_3)_2 \cdot 4H_2O$), 40 g of aluminum nitrate nonahydrate (Al$(NO_3)_3 \cdot 9H_2O$) and 15 g of ferric nitrate nonahydrate (Fe$(NO_3)_3 \cdot 9H_2O$) in sequence with a scale and then adding them into 70 ml of deionized water; placing the mixed solution on a magnetic stirrer and stirring for 60 min to be mixed evenly to obtain a solution A; weighing 50 g of citric acid monohydrate (C$_6$H$_8$O$_7 \cdot$H$_2$O) and adding to the solution A, placing the mixed solution in a water bath at 60° C. and stirring to obtain a light yellow solution B; adding 20 g of glycerol to the light yellow solution B to perform an esterification reaction, and adjusting the temperature of the water bath to 80° C. after one hour and continuing the reaction for 15 hours to obtain the metal-chelate type retarder.

Embodiment 4

A process for preparing a metal-chelate retarder by a sol-gel method sequentially comprises the following steps:

weighing 100 g of calcium nitrate tetrahydrate (Ca($NO_3$)$_2$.4$H_2O$), 20 g of aluminum nitrate nonahydrate (Al($NO_3$)$_3$.9$H_2O$) and 15 g of ferric nitrate nonahydrate (Fe($NO_3$)$_3$.9$H_2O$) in sequence with a scale and then adding them into 70 ml of deionized water; placing the mixed solution on a magnetic stirrer and stirring for 60 min to be mixed evenly to obtain a solution A; weighing 40 g of gluconic acid and adding to the solution A, placing the mixed solution in a water bath at 60° C. and stirring to obtain a light yellow solution B; adding 15 g of ethylene glycol to the light yellow solution B to perform an esterification reaction, and adjusting the temperature of the water bath to 80° C. after two hours and continuing the reaction for 20 hours to obtain the metal-chelate type retarder.

II. Retardation Performance Test of High-Temperature Resistant Oil Well Cement Retarder The retarder synthesized in Embodiment 1 is added to the cement slurry formula (shown in Table 1) and tested under the thickening conditions at a temperature of 90° C. and a pressure of 45 MPa to verify the retardation performance of the chelate.

TABLE 1

Experimental formula

| Cement formula | Cement | Quartz sand | Fluid loss agent (G33S) | Retarder | Water |
|---|---|---|---|---|---|
| Blank group (g) | 600 | 210 | 15 | 0 | 330 |
| Experimental group (g) | 600 | 210 | 15 | 18 | 330 |

TABLE 2

Engineering performance test results of cement slurry for well cementing at different dosages and the same temperature (90° C.) (Embodiment 1)

| No. | Jiahua Cement (g) | Quartz sand (g) | G33S (g) | Tap water (g) | Retarder (g) | Thickening time (min) |
|---|---|---|---|---|---|---|
| 1 | 600 | 210 | 15 | 330 | 0 | 180 |
| 2 | 600 | 210 | 15 | 330 | 6 | 210 |
| 3 | 600 | 210 | 15 | 330 | 12 | 240 |
| 4 | 600 | 210 | 15 | 330 | 18 | 304 |
| 5 | 600 | 210 | 15 | 330 | 24 | 330 |

TABLE 3

Engineering performance test results of cement slurry for well cementing at the same dosage and different temperature (Embodiment 2)

| No. | Jiahua Cement(g) | Quartz sand(g) | G33S(g) | Tap water(g) | Retarder(g) | Experimental temperature(° C.) | Thickening time (min) |
|---|---|---|---|---|---|---|---|
| 1 | 600 | 210 | 15 | 330 | 18 | 90 | 304 |
| 2 | 600 | 210 | 15 | 330 | 18 | 100 | 255 |
| 3 | 600 | 210 | 15 | 330 | 18 | 110 | 219 |
| 4 | 600 | 210 | 15 | 330 | 18 | 120 | 146 |

III. Strength Test of High-Temperature Resistant Oil Well Cement Retarder

The retarder synthesized in Embodiment 1 is added to the cement slurry formula (see Table 1), cured at a temperature of 90° C., and tested for the strengths at days 1, 3, and 7, respectively.

TABLE 4

| | Compressive strength | | |
|---|---|---|---|
| | compressive strength (Mpa) | | |
| Time | 1 d | 3 d | 7 d |
| Blank group | 20.33 | 22.27 | 23.55 |
| Experimental group | — | 12.34 | 25.15 |

It can be seen from Table 4 that the retarder prepared by the process of the present invention effectively improves the cement thickening time, without affecting the strength of cement stone after high-temperature curing.

The invention claimed is:

1. A process for preparing a metal-chelate retarder by a sol-gel method, comprising the following steps: weighing calcium nitrate tetrahydrate, aluminum nitrate nonahydrate and ferric nitrate nonahydrate according to a certain mass ratio and adding them into deionized water; placing the mixed solution on a magnetic stirrer and stirring the mixed solution evenly; adding citric acid monohydrate or gluconic acid, ethylene glycol or glycerol, and placing the mixed solution into a water bath to react to obtain the metal-chelate retarder.

2. The process for preparing the metal-chelate retarder by the sol-gel method according to claim 1, sequentially comprising the following steps:
   (1) adding 80 to 120 g of calcium nitrate tetrahydrate, 20 to 40 g of aluminum nitrate nonahydrate and 10 to 15 g of ferric nitrate nonahydrate into 50 to 70 ml of deionized water, placing the mixed solution on a magnetic stirrer and stirring for 50 to 60 min to be mixed evenly to obtain a solution A;

(2) adding 30 to 50 g of chelating agent to the solution A, placing the mixed solution in a water bath at 60 to 80° C. and stirring to obtain a light yellow solution B, wherein the chelating agent is citric acid monohydrate or gluconic acid; and (3) stirring and adding 5 to 20 g of esterifying agent to the solution B to perform an esterification reaction continuously for 12 to 24 hours to obtain the metal-chelate type retarder, wherein the esterifying agent is ethylene glycol or glycerol.

3. The process for preparing the metal-chelate retarder by the sol-gel method according to claim 2, wherein in the step (2), the chelating agent is added to the solution A, placed in a water bath at 60° C. and stirred for 1 to 2 hours, and then the water bath temperature is adjusted to 80° C.

* * * * *